(12) United States Patent
Bahner et al.

(10) Patent No.: US 6,702,335 B2
(45) Date of Patent: Mar. 9, 2004

(54) COUPLING DEVICE OF A PLUG-IN COUPLING AND PLUG-IN COUPLING WITH SUCH A COUPLING DEVICE

(75) Inventors: Frank Bahner, Offenbach (DE);
Andreas Bauer, Schneeberg (DE);
Gerhard Wachter, Büdingen (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/852,443

(22) Filed: May 9, 2001

(65) Prior Publication Data

US 2001/0043833 A1 Nov. 22, 2001

(30) Foreign Application Priority Data

May 17, 2000 (DE) .......................... 100 24 303

(51) Int. Cl.⁷ ................................ F16L 37/00
(52) U.S. Cl. ......................... 285/305; 285/921
(58) Field of Search .................. 285/82, 91, 305, 285/319, 921; 403/328

(56) References Cited

U.S. PATENT DOCUMENTS

| | | | | |
|---|---|---|---|---|
| 4,059,295 A | * | 11/1977 | Helm | .................. 285/305 |
| 4,453,747 A | * | 6/1984 | Bimba | .................. 285/305 |
| 4,725,081 A | * | 2/1988 | Bauer | .................. 285/305 |
| 4,884,829 A | * | 12/1989 | Funk et al. | ........... 285/305 X |
| 5,152,555 A | * | 10/1992 | Szabo | ............... 285/921 X |
| 5,423,577 A | | 6/1995 | Ketcham | |
| 5,542,716 A | | 8/1996 | Szabo et al. | |
| 5,857,718 A | * | 1/1999 | Kleinschmidt | ............ 285/305 |
| 5,951,063 A | | 9/1999 | Szabo | |
| 6,206,433 B1 | * | 3/2001 | Bloomer | ................ 285/82 X |
| 6,328,344 B1 | * | 12/2001 | Tozaki et al. | ......... 285/305 X |

FOREIGN PATENT DOCUMENTS

| | | | | |
|---|---|---|---|---|
| DE | 3729570 | | 3/1988 | |
| DE | 3143015 | | 4/1999 | |
| SE | 226 540 | * | 5/1969 | ............ 285/319 |

OTHER PUBLICATIONS

Patent Abstracts of Japan, vol. 1996, No. 02, Feb. 29, 1996 & JP 07 260073 A (Showa Alum Corp; Others: 01), Oct. 13, 1995.

* cited by examiner

Primary Examiner—Greg Binda
(74) Attorney, Agent, or Firm—Friedrich Kueffner

(57) ABSTRACT

A coupling device has a coupling receptacle and a matching coupling insert received in the coupling receptacle for connecting two components conveying a fluid. The coupling receptacle has two lateral, diametrically opposed slots and a U-shaped, elastic securing bracket seated on the coupling receptacle with two legs projecting into the lateral slots. The coupling insert has an outer peripheral securing rib and the legs of the securing bracket snap into place behind the securing ring in the coupling position of the coupling device. A securing bushing is arranged inside the coupling receptacle and faces a sealing ring with one end while the other end rests radially outwardly on the securing rib and projects past the lateral slots. The securing bushing has two transverse slots aligned with the two lateral slots, and the two legs of the securing bracket engage the two transverse slots of the securing bushing.

10 Claims, 1 Drawing Sheet

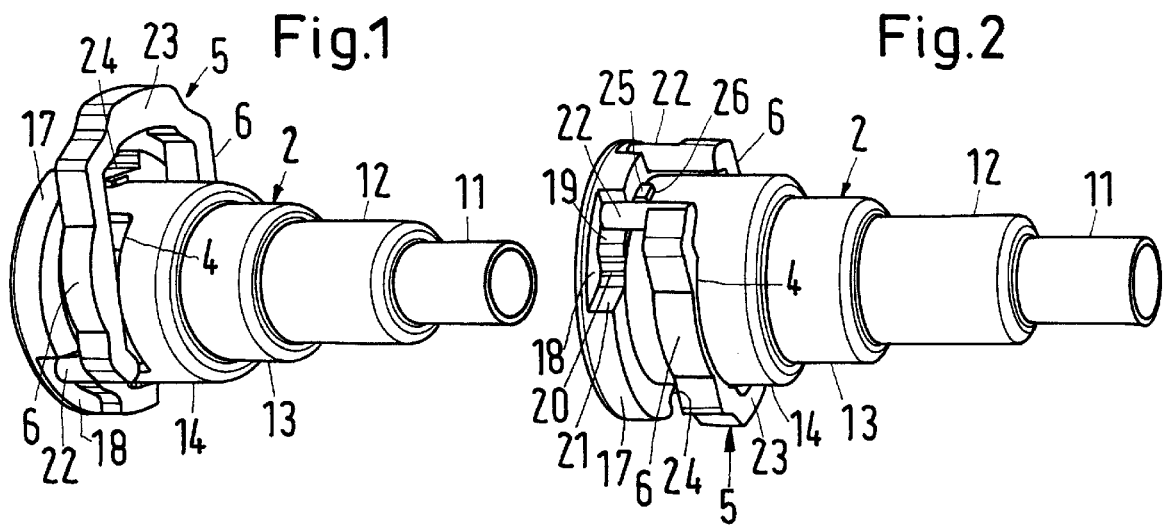
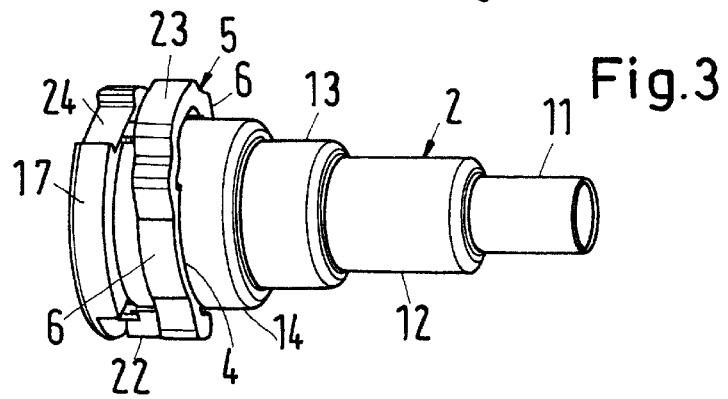
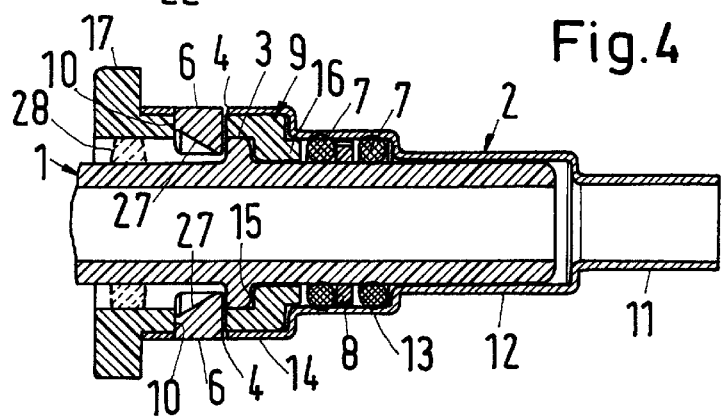
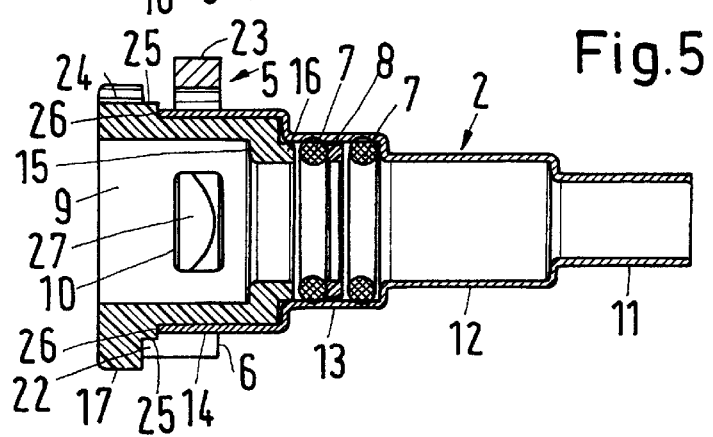

COUPLING DEVICE OF A PLUG-IN COUPLING AND PLUG-IN COUPLING WITH SUCH A COUPLING DEVICE

BACKGROUND OF THE INVENTION

1. Field of the Invention

The invention relates to a coupling device of a plug-in coupling with two insertable, tubular coupling parts, i.e., a coupling insert with a peripherally extending securing rib and a coupling receptacle of metal for receiving the coupling insert, for the purpose of connecting two components conveying a fluid, wherein the coupling device is configured as follows: the coupling receptacle has lateral openings and a substantially U-shaped, elastic securing bracket whose legs project through the openings and snap into place behind the securing rib when inserting the coupling parts into one another; at least one sealing ring and a securing bushing in the coupling receptacle facing with one end the sealing ring end resting in the inserted state of the coupling parts on the securing rib.

Moreover, the invention relates to a plug-in coupling with a coupling device according to the invention.

2. Description of the Related Art

In a known coupling device of this type (DE 31 43 015 C3) the embodiment of the coupling receptacle of metal has the advantage that it can be connected more easily, for example, by welding or soldering, with a component of metal conveying the fluid and that the coupling receptacle as well as the component connected thereto ensure a minimal permeation for environmentally damaging fluids, such as fuel or oil, in a motor vehicle. The securing bushing which prevents sliding of the sealing ring (or the sealing rings) in the coupling receptacle extends, however, only between the sealing ring and the circumferential edge of the securing rib. In the inserted or assembled state of the coupling parts this results in a comparatively large radial spacing between the coupling insert and the inner side of the coupling receptacle having the largest diameter at its receiving end. When a radial load acts on the plug-in coupling, for example, as a result of bending of the components in the form of flexible lines connected thereto, be it by the arrangement of the lines or by strong vibrations or impacts, the two coupling parts can be relatively easily deflected relative to one another by a large amount so that there is the risk of leaks of the connection provided by the plug-in coupling, in particular, when the elasticity of the sealing ring, which is usually an O-ring, deteriorates over time. However, this spacing must be selected relatively large so that the legs of the securing bracket, which are guided, respectively, through two, in total thus four, openings in the coupling receptacle and engage with radially outwardly projecting locking noses (beards) behind an edge of two openings, respectively, can be compressed at their free ends for the purpose of decoupling (releasing) so that the locking noses and openings will disengage and the securing bracket can be pulled out of the openings in order to be able to subsequently pull the coupling insert from the coupling receptacle. The legs of the securing bracket in the inserted, coupled state thus may not rest against the circumference of the coupling insert, but must still engage behind the securing rib which means that the securing rib must have a relatively large outer diameter which requires again a correspondingly large inner diameter of the coupling receptacle. The coupling receptacle therefore requires a correspondingly large quantity of material. Moreover, decoupling is difficult because the legs of the securing bracket may be forced (compressed) against one another only to such an extent that the locking noses and the openings will disengage one another without the legs resting fixedly on the circumference of the coupling insert thereby hindering, if not completely preventing, the securing bracket from being pulled out of the openings.

SUMMARY OF THE INVENTION

It is an object of the present invention to provide a coupling device of the aforementioned kind and a plug-in coupling provided therewith which in the mounted state ensures a reliable seal-tightness while requiring a minimal material expenditure and makes possible a simpler handling during coupling and decoupling.

In accordance with the present invention, this is achieved in that the coupling receptacle has only two openings positioned diametrically oppositely to one another relative to the coupling receptacle and extending transverse thereto, which openings are in the form of slots, through which one leg of the securing bracket extends in its longitudinal direction, respectively, and in that the securing bushing extends past these slots and is provided with two slots extending transversely to the securing bushing, through which slots the legs of the securing bracket also extend in the longitudinal direction of these slots.

With this embodiment, the legs of the securing bracket can be bent away from one another (can be spread) at the outer side of the coupling receptacle for the purpose of decoupling until they disengage the securing rib. The outer diameter of the securing rib and the inner diameter of the coupling receptacle therefore must not be selected so large that a spacing between the legs and the circumference of the coupling receptacle would remain in the coupled state which would make it possible to compress the legs for the purpose of decoupling. This is made possible by the configuration of the securing bushing with a smaller inner diameter and correspondingly minimal spacing between the securing bushing and the coupling insert so that the outer diameter of the coupling receptacle can also be selected to be smaller and can be produced with less material. Since the securing bushing extends axially past a greater portion of the coupling receptacle, the intermediate space between the coupling receptacle and the coupling insert is filled over a larger axial length by the securing bushing and, accordingly, the spacing between the securing bushing and the coupling insert is smaller across an axially longer area so that the coupling receptacle and coupling insert are deflected to a lesser degree relative to one another when radial loading of the plug-in coupling occurs. The seal-tightness of the plug-in coupling is thus ensured to a greater degree.

Preferably, it is provided that the securing bushing is furnished with a flange projecting past the circumference of the coupling receptacle at its free end. This results, on the one hand, in a reduced spacing between the securing bushing and the coupling insert across an even longer area. On the other hand, the flange substantially prevents in the coupled state an accidental contacting of the securing bracket in the direction of insertion of the coupling insert into the receptacle, for example, during the transport, so that a detachment of the securing bracket in this way is essentially completely prevented. Moreover, the flange, when the securing bracket is removed, provides for a simple removal of the securing bushing by pulling it out of the coupling receptacle in order to exchange the sealing ring or the sealing rings.

A possible configuration resides also in that the flange has two radial cutouts whose bottom has a peripheral section, which is coaxial to the longitudinal center axis of the coupling receptacle and has a greater outer diameter than the coupling receptacle, and further has an adjoining radial depression in the circumferential direction at a wall of the cutout and in that the legs of the securing bracket at their ends have axial projections which project into the cutouts and, in the inserted state of the coupling parts, rest against the coaxial peripheral section and for decoupling can be snapped into place in the depressions by radial movement of the securing bracket. As a result of this configuration, decoupling is possible with a simple radial movement of the securing bracket. When carrying out this movement, the projections of the leg ends glide along the peripheral sections of the cutouts with simultaneous spreading apart of the legs to the point of snapping into place in the depressions so that at the same time the projections come to rest against the wall of the cutout. The spreading apart of the legs disengages them from the securing rib. The coupling insert can thus be pulled out of the coupling receptacle. At the same time, the radial movement is limited by the projections of the leg ends resting on the walls of the cutout so that the securing bracket cannot be pulled radially off the coupling receptacle and be lost.

Also, the cutouts can be closed toward the free end of the securing bushing. The securing bracket is therefore not accessible via the peripheral area of the cutouts in the direction of insertion of the coupling insert into the coupling receptacle.

Moreover, it is possible to provide that the flange in the area opposite the transverse member of the securing bracket has a radial recess. This recess makes it easy to insert a tool such as a screwdriver underneath the transverse member of the securing bracket in order to move it radially for the purpose of decoupling.

The flange can moreover have at least one axial projection which engages a groove in the free end of the coupling receptacle. This ensures that during assembly of the coupling receptacle and the securing bushing a predetermined relative rotational angular position of both parts is maintained in which their slots are aligned with one another, respectively.

Preferably, the securing bushing is comprised of hard plastic material and the securing bracket of a hard-elastic plastic material. This makes possible a fast manufacture of the two parts at large production numbers per time unit.

Moreover, the legs of the securing bracket can have at their facing inner sides a slant widening in the direction of the insertion opening of the securing bushing. This slant facilitates the insertion of the coupling insert into the coupling receptacle up to the point where the securing rib snaps into place behind the legs of the securing bracket.

Moreover, it is advantageous when the coupling insert in a plug-in coupling with the coupling receptacle according to the invention comprises an annular bead which, in the assembled state of the coupling parts, is positioned within the securing bushing at a greater spacing from the sealing ring than the securing rib, so that the legs of the securing bracket engage between the securing rib and the annular bead, wherein the outer diameter of the annular bead is substantially matching the greatest inner diameter of the securing bushing. The coupling insert can then be supported in the case of a radial load of the plug-in coupling by means of the annular bead at the inner side of the securing bushing. This prevents with even greater safety a relative deflection or angled position of the two coupling parts.

BRIEF DESCRIPTION OF THE DRAWING

In the drawing:

FIG. 1 is a perspective view of an embodiment of the coupling device according to the invention in a position in which a securing bracket of the coupling receptacle is in its decoupling position;

FIG. 2 is another perspective view of the coupling receptacle according to FIG. 1 in which the securing bracket is in the coupling position;

FIG. 3 shows the coupling receptacle in the coupled state of the securing bracket but in a position rotated by 180° relative to FIG. 2;

FIG. 4 is an axial section of the coupling device according to FIG. 3; and

FIG. 5 is an axial section of the coupling device according to FIG. 2.

DESCRIPTION OF THE PREFERRED EMBODIMENTS

The coupling device according to FIGS. 1 through 5 forms a part of a plug-in coupling with two insertable, tubular coupling parts, i.e., a coupling insert 1 and a coupling receptacle 2 serving for receiving the coupling insert 1, for connecting two components (not illustrated) for conveying a fluid, for example, components in the form of a flexible fluid line, preferably made of metal in the form of a corrugated pipe, connectable to the free end of the coupling receptacle 2, and a fluid line connectable to the coupling insert 1. As an alternative, the coupling insert 1 can also be a connecting socket of a component to be supplied with the fluid, for example, the housing of a radiator of a motor vehicle. In the illustrated embodiment, the tubular coupling receptacle 2 is made of metal and the coupling insert 1 is made of hard plastic material but it can also be made of metal. Moreover, it is provided with an outer peripheral securing rib 3.

The coupling receptacle 2 is provided with two lateral openings 4 in the form of slots which are positioned diametrically opposite one another relative to the coupling receptacle 2 and extend transversely, similar to a chord on a circle, relative to the longitudinal center axis of the coupling receptacle 2. It is further provided with a substantially U-shaped, elastic securing bracket 5 whose legs 6 project through the openings 4 and, when assembling the coupling parts 1, 2, will lock behind the securing rib 3. Moreover, the coupling device comprises a sealing ring 7, in the shown embodiment two sealing rings 7 which are separated by a spacer ring 8, and a securing bushing 9 in the coupling receptacle 2. The securing bushing 9 faces with one end the sealing ring 7 and, in the inserted state of the coupling parts 1, 2, rests against the securing rib 3 and projects past the slots 4. The securing bushing 9 has also two slots 10 which extend transversely to the longitudinal center axis of the bushing 9 and are positioned diametrically opposite one another. The slots 10 are aligned with the slots 4. The legs 6 of the securing bracket 5 project not only in the longitudinal direction through the slots 4, respectively, but also through the slots 10 so that, aside from their restoring spring force, they can be spread outwardly without impairment.

The coupling receptacle 2 has four sections 11, 12, 13, and 14 with different diameters which increase sequentially in the direction from the section 11 to the section 14. The inner diameter of the section 11 corresponds to the inner diameter of the coupling insert 1; the inner diameter of the section 12 corresponds to the outer diameter of the coupling insert 1; the radial spacing of the section 13 from the outer circumference of the coupling insert 1 corresponds to the radial thickness of the sealing rings 7 compressed after insertion of the coupling parts 1, 2; the inner diameter of the section 14 corresponds to the outer diameter of the securing bushing 9; and the inner diameter of the securing bushing 9 in the area of the securing bracket 5 or its legs 6 corresponds to the outer diameter of the securing rib 3. In the inserted state of the coupling insert 1, the securing rib 3 rests against a radially inwardly projecting shoulder 15 of the securing bushing 9, and an axial annular projection 16 in the securing bushing 9 extends into the annular space between the section 12 of the coupling receptacle 2 and the coupling insert 1 provided for receiving the sealing rings 7 and the spacer ring 8. The radial thickness of the projection 16 corresponds in this connection approximately to the radial thickness of this annular space.

The securing bushing 9 is provided with a flange 17 on its free end, which flange projects past the circumference of the coupling receptacle 2 in order to prevent that the securing bracket 5, when in its position according to FIGS. 2 to 4 in which it engages the securing rib 3, can be accessed in the direction of insertion of the coupling insert 1 into the coupling receptacle 2 (from the left in FIGS. 1 through 5). In this way, accidental decoupling, for example, during transport, by exertion of an axial force onto the securing bracket 5 in this direction is prevented.

The flange 17 has moreover two radial cutouts 18 whose bottom has a peripheral section 19, that is coaxial to the longitudinal center axis of the coupling receptacle 2 and has a greater outer diameter than the coupling receptacle 2, and also has a radial depression 20, adjoining the peripheral section 19 in the circumferential direction and located adjacent to a wall 21 of the cutout 18. The legs 6 of the securing bracket 5 are provided at their ends with axial projections 22 which project into these cutouts 18 and, in the inserted state of the coupling parts 1, 2 according to FIG. 4, rest against the coaxial peripheral section 19. For decoupling, the axial projections 22 can be snapped into place in the depressions 20 by radial movement of the securing bracket 5. The cutouts 18 are closed in a direction toward the free end of the securing bushing 9. The flange 17 has, at least adjacent to the transverse member 23 of the securing bracket 5, a radial recess 24. Moreover, the flange 17 has at least one axial projection 25 which engages a groove 26 in the receiving end of the coupling receptacle 2.

The legs 6 of the securing bracket 5 have at their facing inner sides a slant 27 widening in the direction of the insertion opening of the securing bushing 9.

The securing bushing 9 is comprised of hard plastic material and the securing bracket 5 of hard-elastic plastic material.

In addition, the coupling insert 1 can have an annular bead 28 which, in the inserted state of the coupling parts 1, 2, is positioned within the securing bushing 9 and spaced at a greater spacing from the sealing ring 7 or the sealing rings 7 than the securing rib 3. The legs 6 of the securing bracket 5 engage then between the securing rib 3 and the annular bead 28. The outer diameter of the annular bead 28 corresponds substantially to the greatest inner diameter of the securing bushing 9.

In order to connect the coupling parts 1, 2, and thus the components connected thereto, to one another, first the securing bracket 5 is positioned in the coupling position according to FIGS. 2 to 4 in which its legs 6 project radially inwardly, as illustrated in FIG. 4, and the projections 22 on the ends of the legs 6 rests against the peripheral sections 19 at the bottom of the radial cutouts 18, as illustrated in FIG. 2. Subsequently, the coupling insert 1 is inserted into the section 12 of the coupling receptacle 2 so that the securing rib 3 glides across the slant 27 at the inner sides of the legs 6 of the securing bracket 5 causing spreading apart of the legs 6 until it contacts the shoulder 15 of the securing bushing 9 and the legs 6 spring back into the position illustrated in FIG. 4 in which the securing rib 3 is snapped into place behind the legs 6. Since the legs 6 penetrate radially the slots 4 of the coupling receptacle 2 as well as the slots 10 of the securing bushing 9, not only the coupling parts 1, 2 but also the securing bushing 9 and the coupling receptacle 2 are connected to one another. The radial spacing between the inner side of the securing bushing 9 and the coupling insert 1 and the outer diameter of the securing rib 3 of the coupling insert 1 can be kept relatively small because, for the purpose of decoupling, it is not required that the legs 6 must first be radially pushed inwardly, as in the known devices, so that a significant play between the legs 6 and the outer side of the coupling insert 1 is no longer needed (the illustrated scale is approximately twice that of the real embodiment). Accordingly, on the one hand, a deflection of the two coupling parts 1, 2 relative to one another as a result of radial loading of the plug-in coupling can be counteracted more strongly, in particular, when the coupling insert 1 is provided with the additional annular bead 28 and, on the other hand, the coupling insert 1 with its securing rib 3 is guided along a longer axial path on the inner side of the securing bushing 9 during insertion into the coupling receptacle 2 without canting so that the securing rib 3 snaps safely into place behind the legs 6 of the securing bracket 5. For decoupling the coupling parts 1, 2, the transverse member 23 can be engaged through the recess 24 in the flange 17 by means of a flat tool, for example, the blade of a screwdriver, and can be radially moved relative to the coupling receptacle 2. This causes the projections 22 at the ends of the legs 6 to glide on the peripheral section 19 so that the legs 6 are spread apart and move into the contact position at the walls 21 of the cutouts 18, whereupon they snap into place in the depressions 20 and then remain in this position without the securing bracket 5 becoming detached from the coupling receptacle 2. Subsequently, the coupling insert 1 can be pulled out of the coupling receptacle 2 because the legs 6 no longer project radially inwardly from the inner side of the securing bushing 9. In the decoupling position of the securing bracket 5 according to FIG. 1, the legs 6 also engage no longer the slots 10 of the securing bushing 9 so that the securing bushing 9, if needed, can be pulled out of the coupling receptacle 2 by simply gripping the flange 17 and pulling apart the securing bushing 9 and the coupling receptacle 2. Subsequently, if needed, the sealing rings 7 can be exchanged.

In order to ensure that, for assembling the coupling device, the coupling receptacle 2 and the securing bushing 9 are inserted in the required rotational position relative to one another, in which rotational position the slots 4 and 10 are aligned with one another, the projections 25 and grooves 26 are provided which in the required relative rotational position of the two parts 2 and 9 fit into one another.

In order to mount the securing bracket 5 on the coupling receptacle 2, it is only necessary to place it astride on the section 13 of the coupling receptacle 2 and to then push it forwardly axially toward the flange 17 until its projections 22 engage the cutouts 18.

Accordingly, not only the coupling and decoupling of the plug-in coupling but also the assembly and demounting of all elements of the coupling device are very simple.

While specific embodiments of the invention have been shown and described in detail to illustrate the inventive principles, it will be understood that the invention may be embodied otherwise without departing from such principles.

What is claimed is:

1. A coupling device of a plug-in coupling, the coupling device comprising:

a tubular coupling receptacle of metal having a receiving end and a matching tubular coupling insert configured to be received via the receiving end in the coupling receptacle in a coupling position for connecting two components conveying a fluid;

the coupling receptacle having two lateral slots positioned diametrically opposite one another and having a longitudinal extension in a direction perpendicular to a longitudinal center axis of the coupling receptacle;

a U-shaped, elastic securing bracket seated externally on the coupling receptacle and having two legs extending parallel to the two lateral slots and projecting into the lateral slots, respectively;

the coupling insert having an outer peripheral securing rib, wherein the legs of the U-shaped, elastic securing bracket snap into place behind the securing rib when the coupling insert and the coupling receptacle are in the coupling position;

at least one sealing ring arranged in the interior of the coupling receptacle;

a securing bushing arranged in the interior of the coupling receptacle, wherein the securing bushing has a first end and a second end, the first end facing the sealing ring and the second end resting against a radially outer surface of the securing rib and projecting past the lateral slots;

wherein the securing bushing has two transverse slots aligned with the two lateral slots and configured such that the two legs of the U-shaped, elastic securing bracket penetrate the two transverse slots, respectively, and engage the securing rib from behind.

2. The coupling device according to claim 1, wherein the second end of the securing bushing projects from the coupling receptacle and has a flange projecting radially outwardly past an outer circumference of the coupling receptacle.

3. The coupling device according to claim 2, wherein the flange has two radial cutouts, wherein each one of the radial cutouts has radial sidewalls and a bottom, wherein the bottom has a peripheral section, coaxially arranged to the longitudinal center axis of the coupling receptacle and having an outer diameter that is greater than an outer diameter of the coupling receptacle, and a radial depression adjoining the peripheral section in the circumferential direction and located adjacent to one of the radial sidewalls, wherein the two legs of the U-shaped, elastic securing bracket have free ends provided with axial projections, wherein the axial projections project in the coupling position into the radial cutouts and rest against the peripheral section, wherein, for decoupling the coupling insert and the coupling receptacle from one another, the axial projections snap into place in the radial depressions by moving the U-shaped, elastic securing bracket radially.

4. The coupling device according to claim 3, wherein the radial cutouts are closed in a direction toward the second end of the securing bushing.

5. The coupling device according to claim 2, wherein the U-shaped, elastic securing bracket has a transverse member connecting the two legs to one another, wherein the flange has an area with a radial recess located opposite the transverse member.

6. The coupling device according to claim 2, wherein the flange has at least one axial projection and wherein the coupling receptacle has a groove at the receiving end configured to receive the axial projection.

7. The coupling device according to claim 1, wherein the securing bushing consists of hard plastic material.

8. The coupling device according to claim 1, wherein the U-shaped, elastic securing bracket consists of hard-elastic plastic material.

9. The coupling device according to claim 1, wherein the two legs of the U-shaped, elastic securing bracket have inner sides facing one another, wherein the inner sides have a slant so as to widen in a direction toward the receiving end of the coupling receptacle.

10. A plug-in coupling comprising a coupling device according to claim 1, wherein the coupling insert comprises an annular bead which, in the coupling position of the coupling receptacle and the coupling insert, is positioned in the securing bushing at a greater spacing from the sealing ring than the securing rib, wherein the two legs of the U-shaped, elastic securing bracket engage between the securing rib and the annular bead, and wherein the outer diameter of the annular bead matches substantially the largest inner diameter of the securing bushing.

* * * * *